US010215923B2

(12) United States Patent
Murphy et al.

(10) Patent No.: US 10,215,923 B2
(45) Date of Patent: Feb. 26, 2019

(54) NANOPOSITIONER AND METHOD OF MAKING

(71) Applicant: Okinawa Institute of Science and Technology School Corporation, Okinawa (JP)

(72) Inventors: Rafino Miguel James Murphy, Okinawa (JP); Fuchuan Lei, Okinawa (JP); Jonathan Ward, Okinawa (JP); Sile Nic Chormaic, Okinawa (JP); Yong Yang, Okinawa (JP)

(73) Assignee: Okinawa Institute of Science and Technology, Onna-son, Kunigami-gun, Okinawa (JP)

( * ) Notice: Subject to any disclaimer, the term of this patent is extended or adjusted under 35 U.S.C. 154(b) by 0 days.

(21) Appl. No.: 16/036,517

(22) Filed: Jul. 16, 2018

(65) Prior Publication Data
US 2019/0033527 A1    Jan. 31, 2019

Related U.S. Application Data

(60) Provisional application No. 62/537,309, filed on Jul. 26, 2017.

(51) Int. Cl.
| | |
|---|---|
| *G02B 6/26* | (2006.01) |
| *C03B 37/15* | (2006.01) |
| *B23K 26/00* | (2014.01) |
| *B23K 26/073* | (2006.01) |
| *B23K 26/06* | (2014.01) |
| *B23K 26/04* | (2014.01) |
| *B23K 26/354* | (2014.01) |

(Continued)

(52) U.S. Cl.
CPC .......... *G02B 6/262* (2013.01); *B23K 26/0006* (2013.01); *B23K 26/04* (2013.01); *B23K 26/0622* (2015.10); *B23K 26/0626* (2013.01); *B23K 26/073* (2013.01); *B23K 26/354* (2015.10); *B23K 26/355* (2018.08); *C03B 37/15* (2013.01)

(58) Field of Classification Search
CPC .. G02B 6/262; B23K 26/0622; B23K 26/355; B23K 26/354; B23K 26/04; B23K 26/073; B23K 26/0006; B23K 26/0626; C03B 37/15
See application file for complete search history.

(56) References Cited

U.S. PATENT DOCUMENTS 5,293,438 A * 3/1994 Konno ................. G02B 6/2552
                                                          385/35

* cited by examiner

*Primary Examiner* — Andrew Jordan
(74) *Attorney, Agent, or Firm* — Chris Tanner, Esq.; FYPA, PLLC

(57) ABSTRACT

A tunable, all-optical, coupling method for a high-Q silica microsphere and an optical waveguide is disclosed. By means of a novel optical nanopositioning method, induced thermal expansion of an asymmetric microsphere stem for laser powers up to 211 mW is observed and used to fine tune the microsphere-waveguide coupling. Microcavity displacements ranging from (0.61±0.13)-(3.49±0.13) µm and nanometer scale sensitivities varying from (2.81±0.08)-(17.08±0.76) nm/mW are obtained. Additionally, an apparent linear dependency of coupling distance on stem laser heating is achieved. Using these methods, coupling can be altered such that the differing and customizable coupling regimes can be achieved.

20 Claims, 14 Drawing Sheets

(51) Int. Cl.
*B23K 26/352* (2014.01)
*B23K 26/0622* (2014.01)

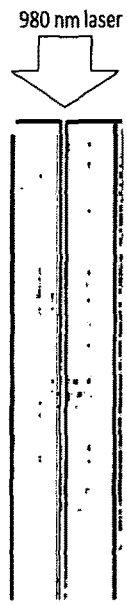 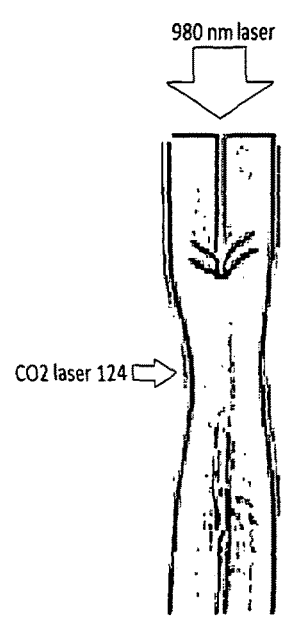 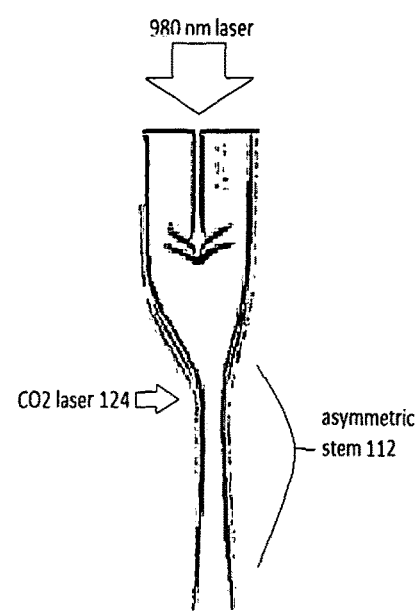
FIG. 1A  FIG. 1B  FIG. 1C
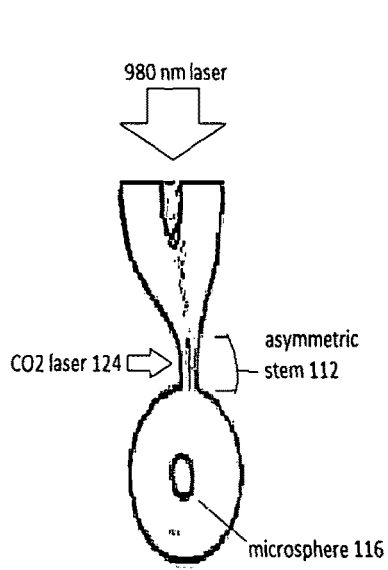 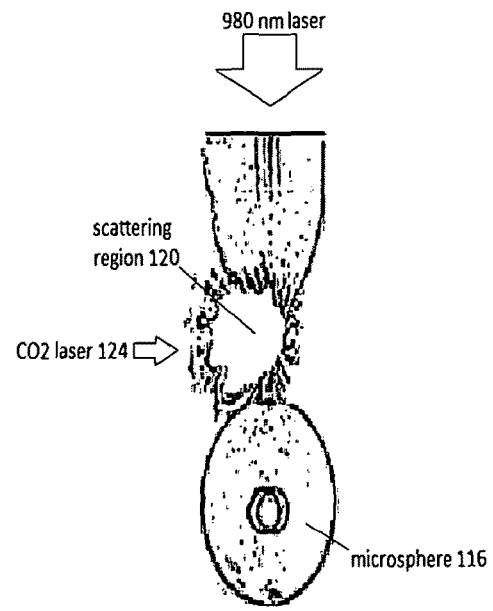
FIG. 1D  FIG. 1E

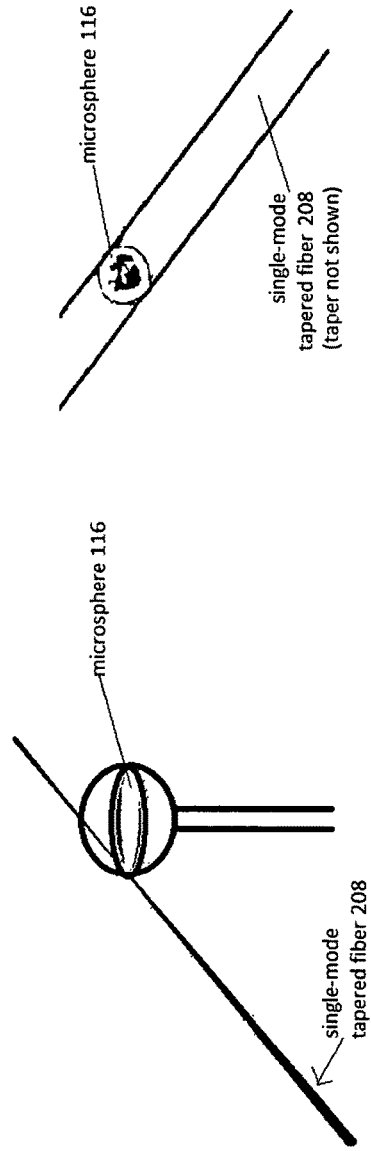
FIG. 2C
FIG. 2D
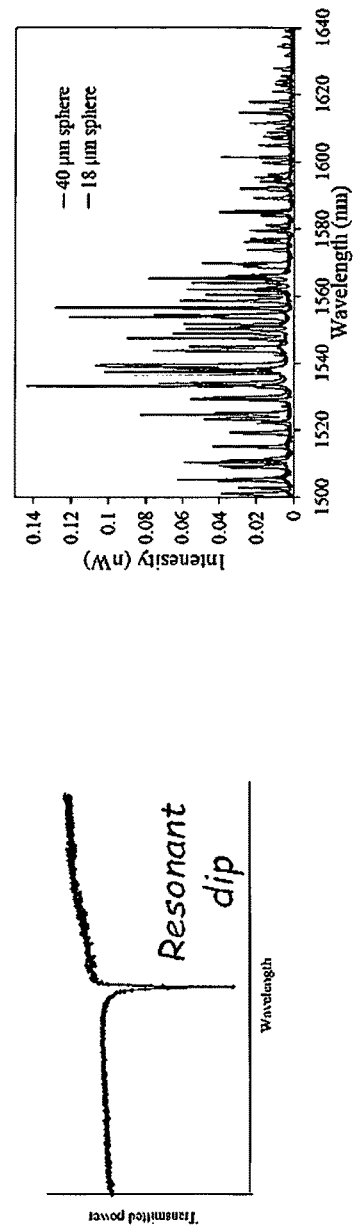
FIG. 2E
FIG. 2F

NANOPOSITIONER AND METHOD OF MAKING

BACKGROUND

Whispering gallery mode (WGM) resonators have shown much promise in terms of their versatility and scope in the last number of decades. These microcavities, with inherently small mode volumes (Vm) and high-Q factors, allow for strong light-matter interactions and have become widely used in bio-sensing and nanoparticle detection, temperature, refractive index and pressure sensing quantum optics and electrodynamics, microlaser development, and as a means of exploring optomechanical and nonlinear effects. Despite extensive research on microcavities of various geometries, fabrication methods, and properties, the commonplace bulky experimental apparatus used in microresonator experiments has impeded their successful incorporation into many lab-on-a-chip or miniaturized systems.

FIGS. 5A, 5B, and 5C show an assortment of Prior Art WGM mechanisms. Light travelling inside sphere, strikes glass-air interface at angle of incidence greater than a critical angle, which gives rise to a concept known as total internal reflection (TIR). If a particular microsphere is of good quality, light passed therethrough can undergo multiple reflections, which leads to long photon storage lifetimes, and low mode volume. These are desired characteristics. Specifically, long photon storage lifetimes means it is possible to improve storage of photons due to increased light intensity in a cavity located within the microsphere.

In order to further augment the sensitivity of these WGM systems post-fabrication, the coupling between a given resonator and optical source must be properly managed. With regards to microsphere resonator systems, finely tuned coupling is usually achieved by means of a mechanical or piezoelectric nanometer resolution positioner. However, such devices are difficult to incorporate into miniaturized microsphere or lab-on-a-chip systems that require a tunable coupling mechanism. Other non-mechanical means of realizing coupling regime control have been explored in the past, but had limitations. Consequently, a more efficient coupling mechanism is desired.

SUMMARY OF INVENTION

A system of achieving nanometer scale tunable coupling by taking advantage of thermo-mechanical effects arising from asymmetric microsphere stem fabrication, external laser heating, and thermal expansion in single mode optical fiber is disclosed.

It is imperative that the coupling between the microresonator and waveguide can be manipulated in such a way that a high coupling efficiency and low loss are maintained. For example, a tapered silica fiber could be used to excite high-Q whispering gallery modes in silica microspheres. A critical coupling regime for this experimental framework was discovered. The ease with which tapered fibers can be integrated into optical networks, as well as their inherent high coupling efficiency, are some of the many characteristics that make tapered fibers a favored option over other coupling methods (e.g. a prism).

The embodiments herein are not restricted to microresonator coupled waveguide frameworks. With careful development and implementation this method could be used within photonic molecule systems as a means of varying the coupling between adjacent microcavities and enhancing light-matter interactions, or perhaps as a micron scale nanostage, where the sphere acts as a holder for objects which can then be positioned by simply varying the laser power.

A 980 nm laser and asymmetric-stem microsphere system is used to develop a tunable, thermo-mechanical coupling method within a WGM resonator-tapered fiber waveguide coupling system. Examination of this optical nanopositioning device with four independent samples shows a linear dependency of coupling distance with laser power, with sensitivities ranging from $(2.81\pm0.08)$-$(17.08\pm0.76)$ nm/mW. Under the right local conditions within the microsphere stem, traversing the different coupling regimes using this method becomes possible. In the future, this method could be used as a means of enabling tunable microsphere coupling in miniaturized or lab-on-a-chip resonator systems, photonic molecule systems and other nanopositioning systems.

DETAILED DESCRIPTION OF DRAWINGS

FIGS. 1A, 1B, and 1C shown an initial state of the optical fiber and the initial asymmetry resulting from side heating with a sub-fiber diameter CO2 laser spot size and ~12% power.

FIGS. 1D-1E show final asymmetric-stem sample microsphere after fabrication, highlighting the nm laser scattering region.

FIGS. 2C, 2D, and 2E show more detail about couplings according to the embodiments herein.

FIG. 2F shows a plot of intensity (vertical axis) v. wavelength (horizontal axis) for two different diameters of spheres.

Figure 2B:
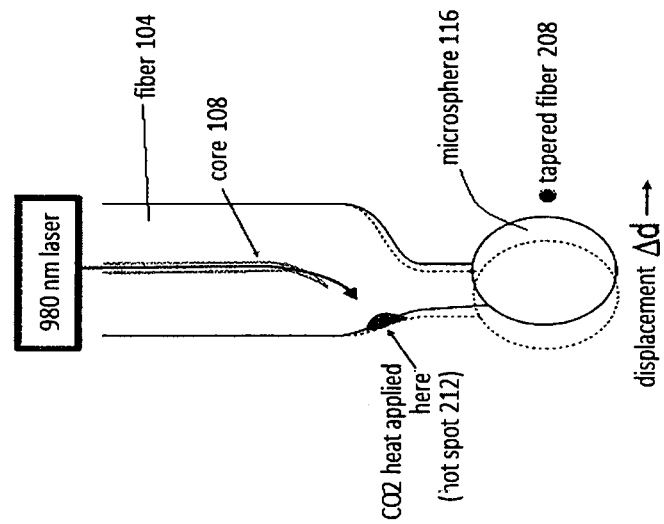
FIG. 2B shows deformation of the fiber during fabrication redirects the incident laser light towards the asymmetric stem.
Figure 2A:
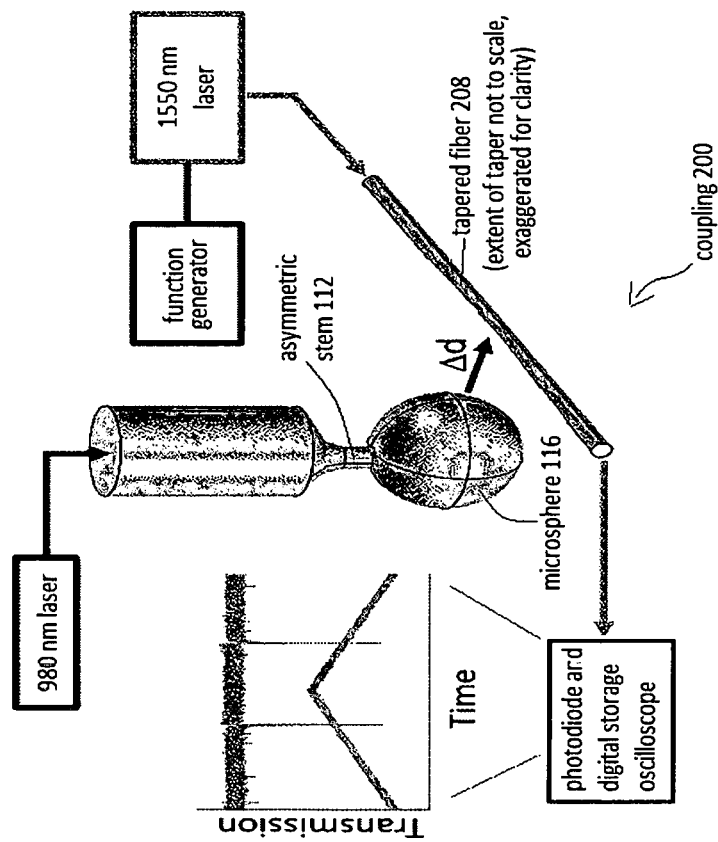
FIG. 2A shows a schematic diagram of the experimental set-up used to characterize the tunable thermo-mechanical coupling.
Figure 2H:
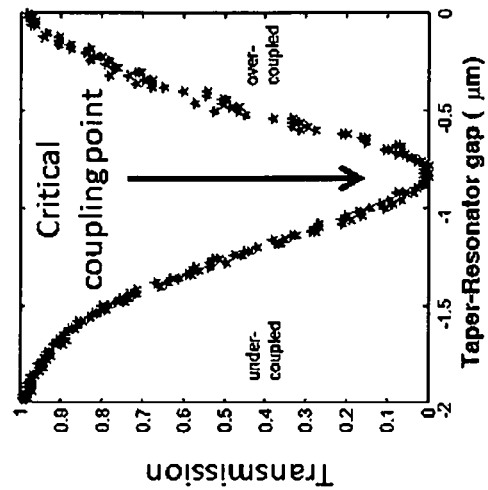
Figure 2G:
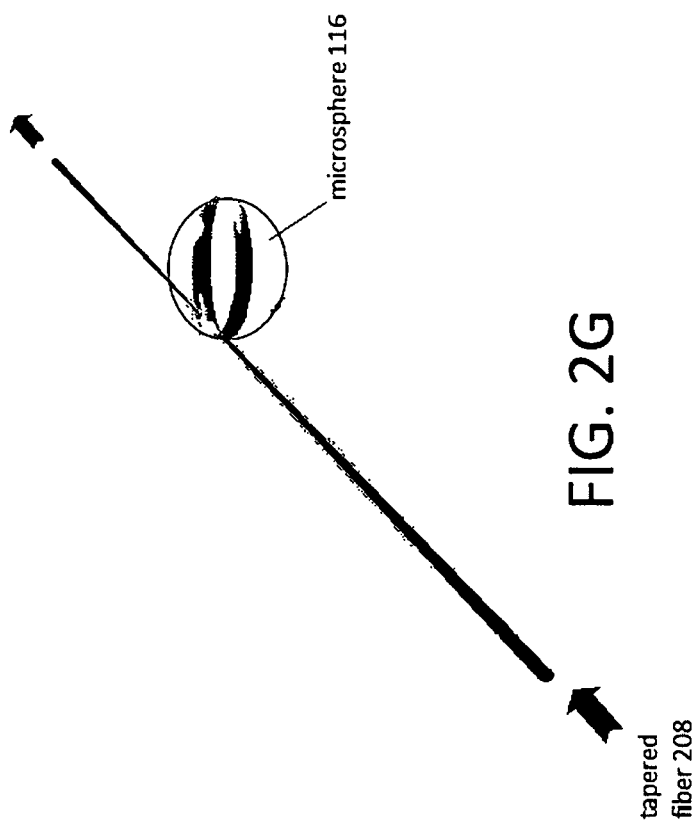

FIG. 2G shows more detail about couplings according to the embodiments herein.

FIG. 2H shows a graphic representation of various coupling conditions.

Figure 3A:
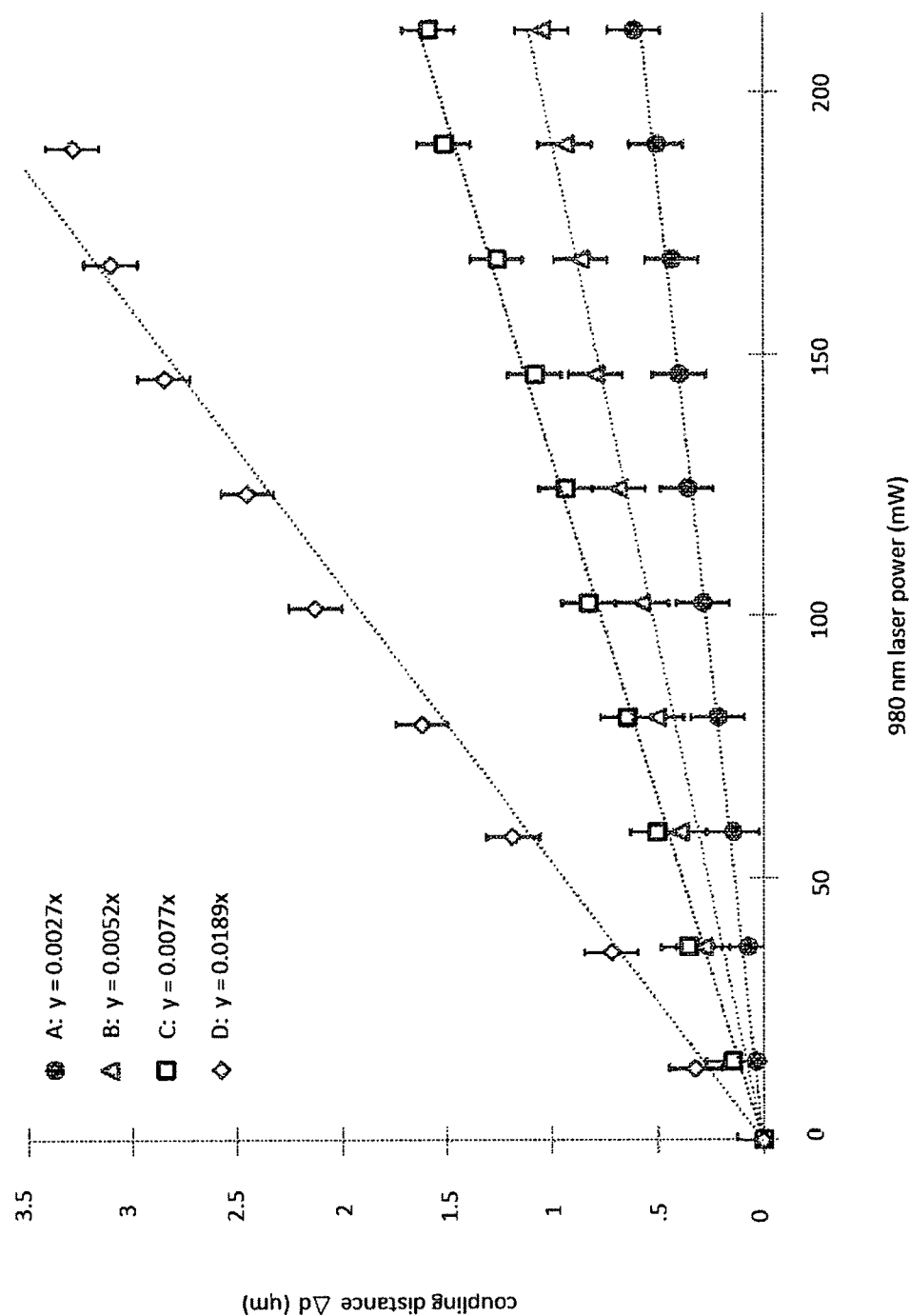

FIG. 3A shows a change in coupling distance, $\Delta d$, for four independent samples, A, B, C and D.

Figure 3B:
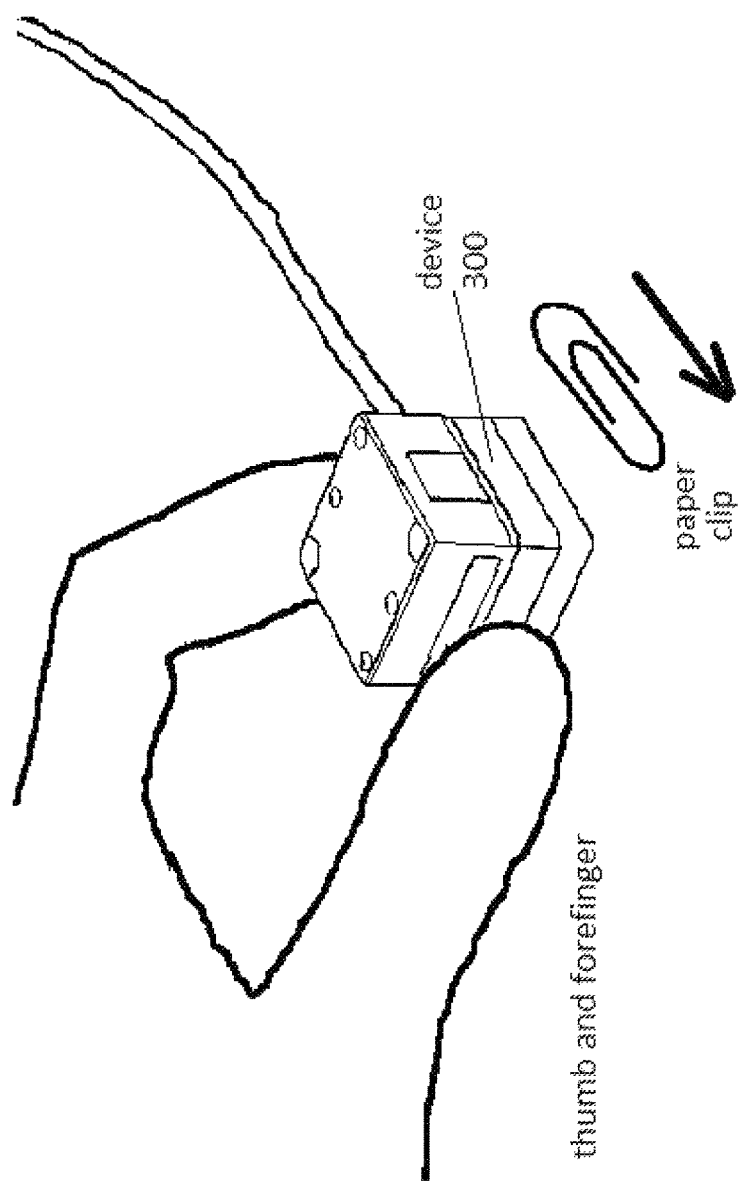
Figure 3C:
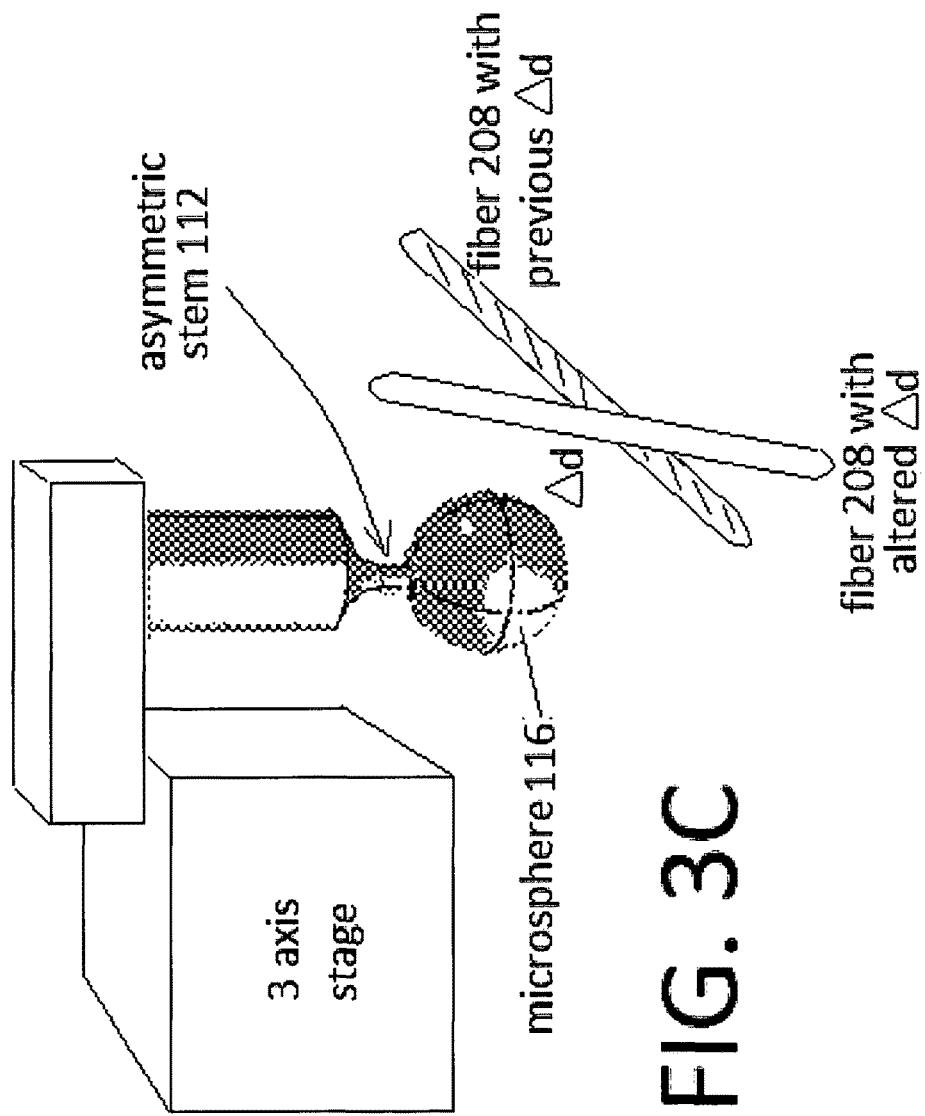

FIGS. 3B-3C show an example implementation of a coupling control.

Figure 4A:
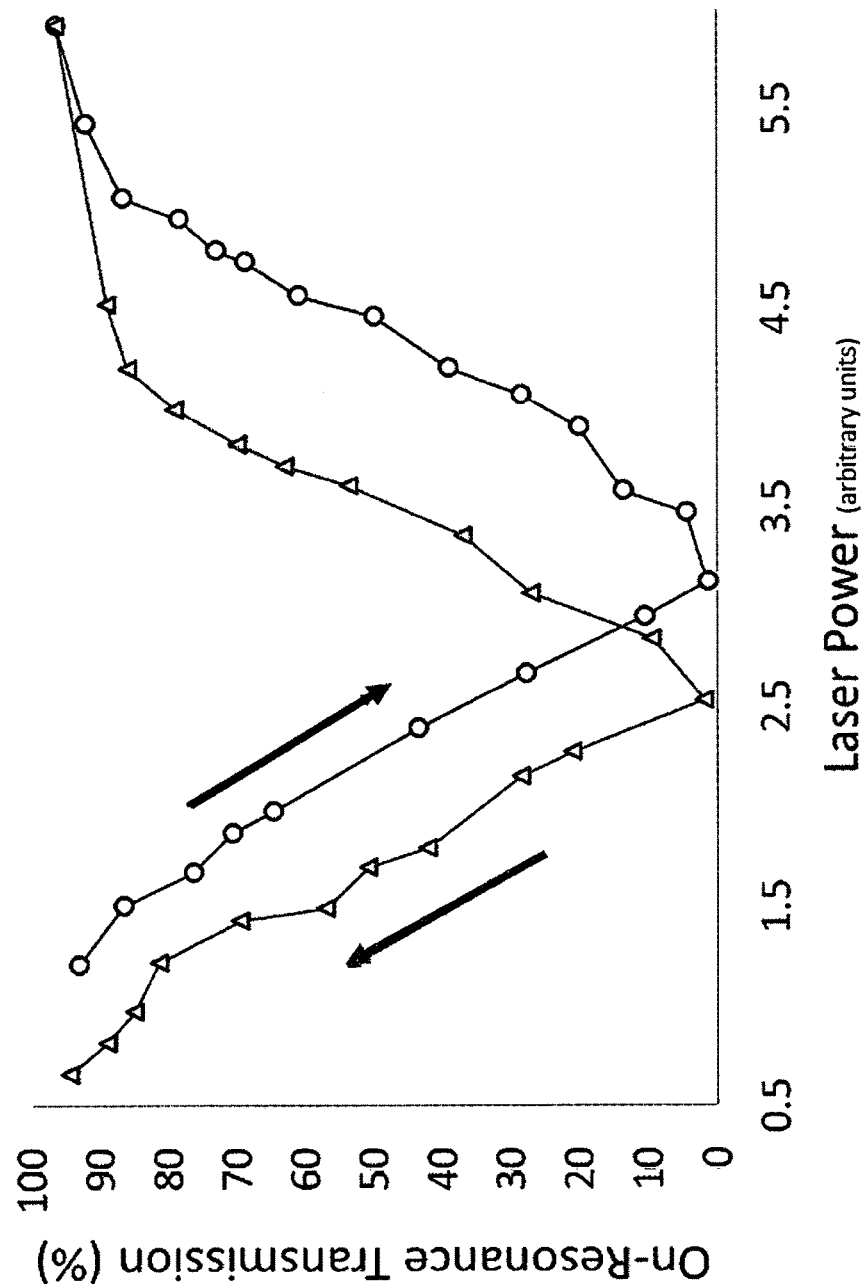

FIG. 4A shows an on-resonance transmission as a function of the 980 nm laser power for sample D. The Q-factor of the microsphere sample is ~108.

Figure 4B:
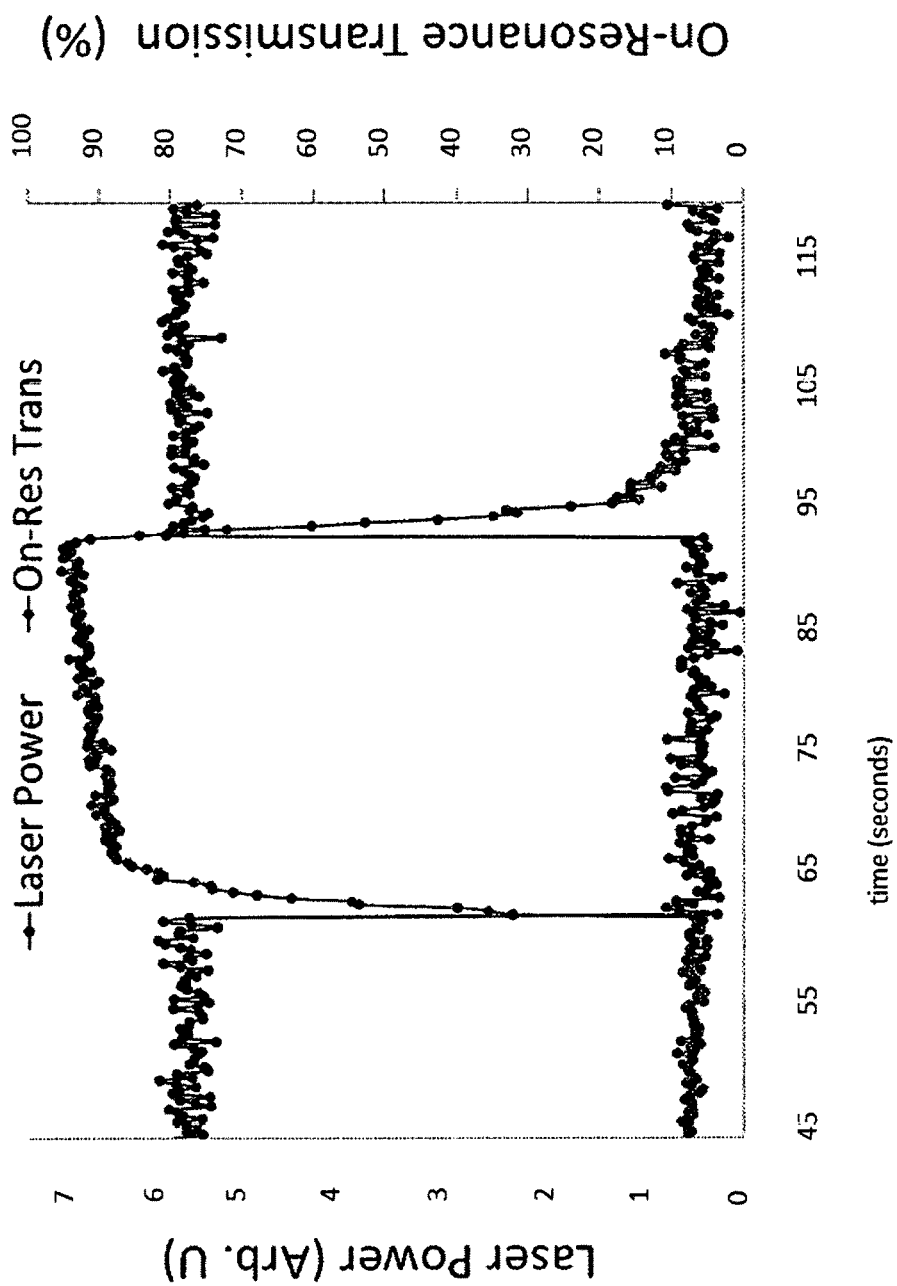

FIG. 4B shows a change in coupling versus time when the 980 nm laser is switched on and off.

Figure 5C:
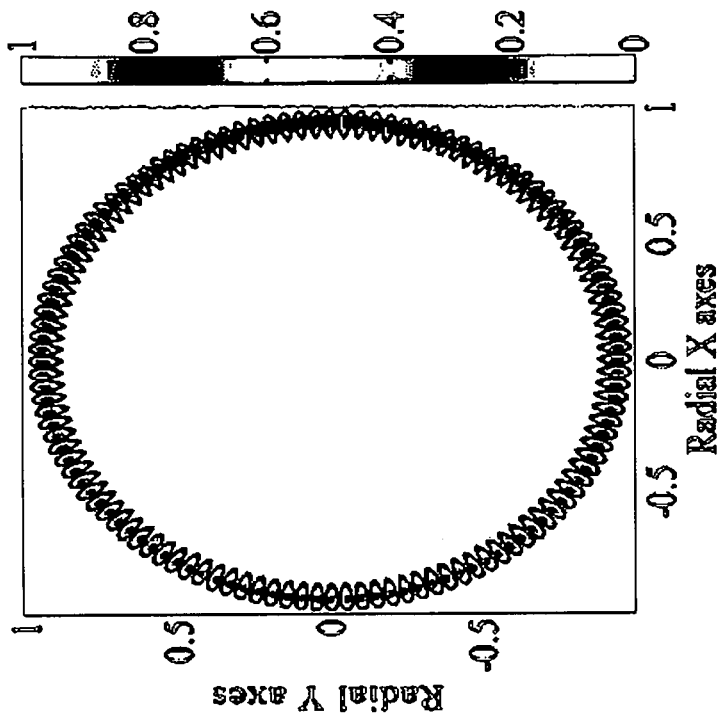
Figure 5A:
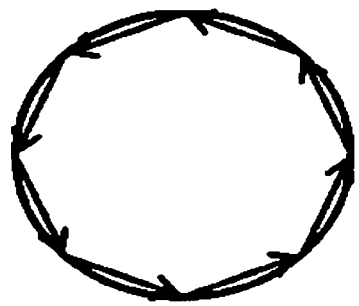
Figure 5B:
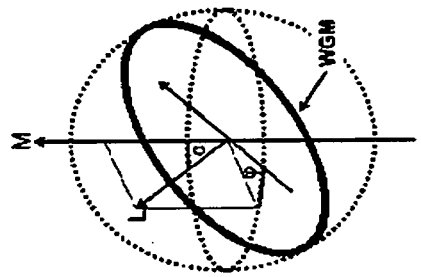

FIGS. 5A, 5B, and 5C show an assortment of Prior Art WGM mechanisms.

Figure 6:
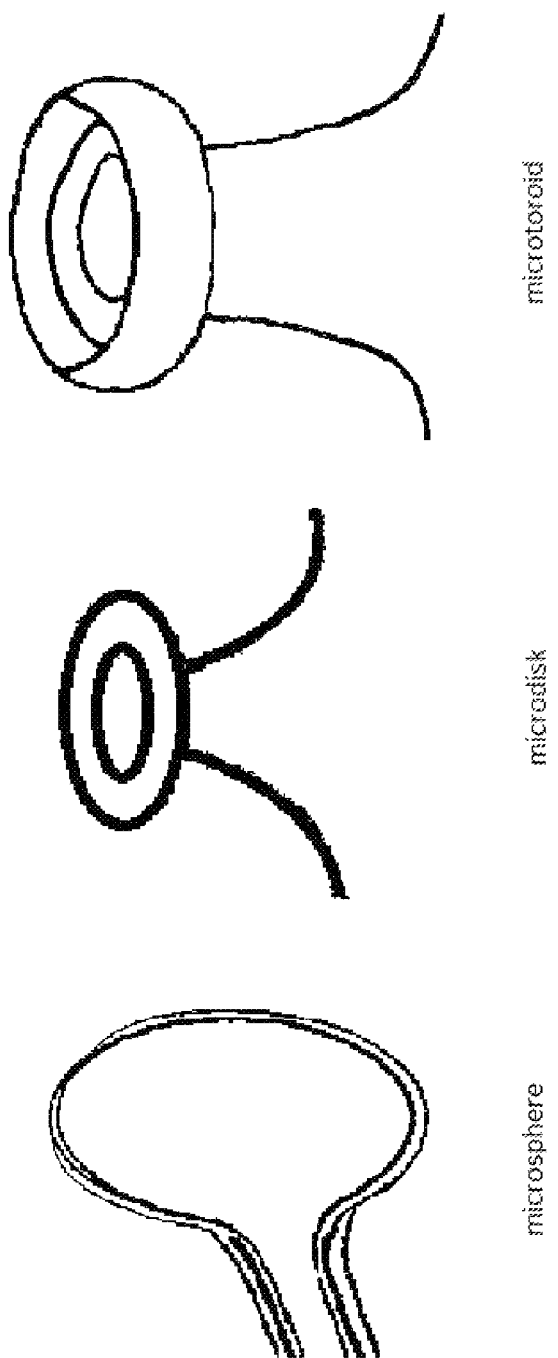

FIG. 6 shows implementations of WGM systems, including a microsphere, a microdisk, and a microtoroid.

Figure 7:
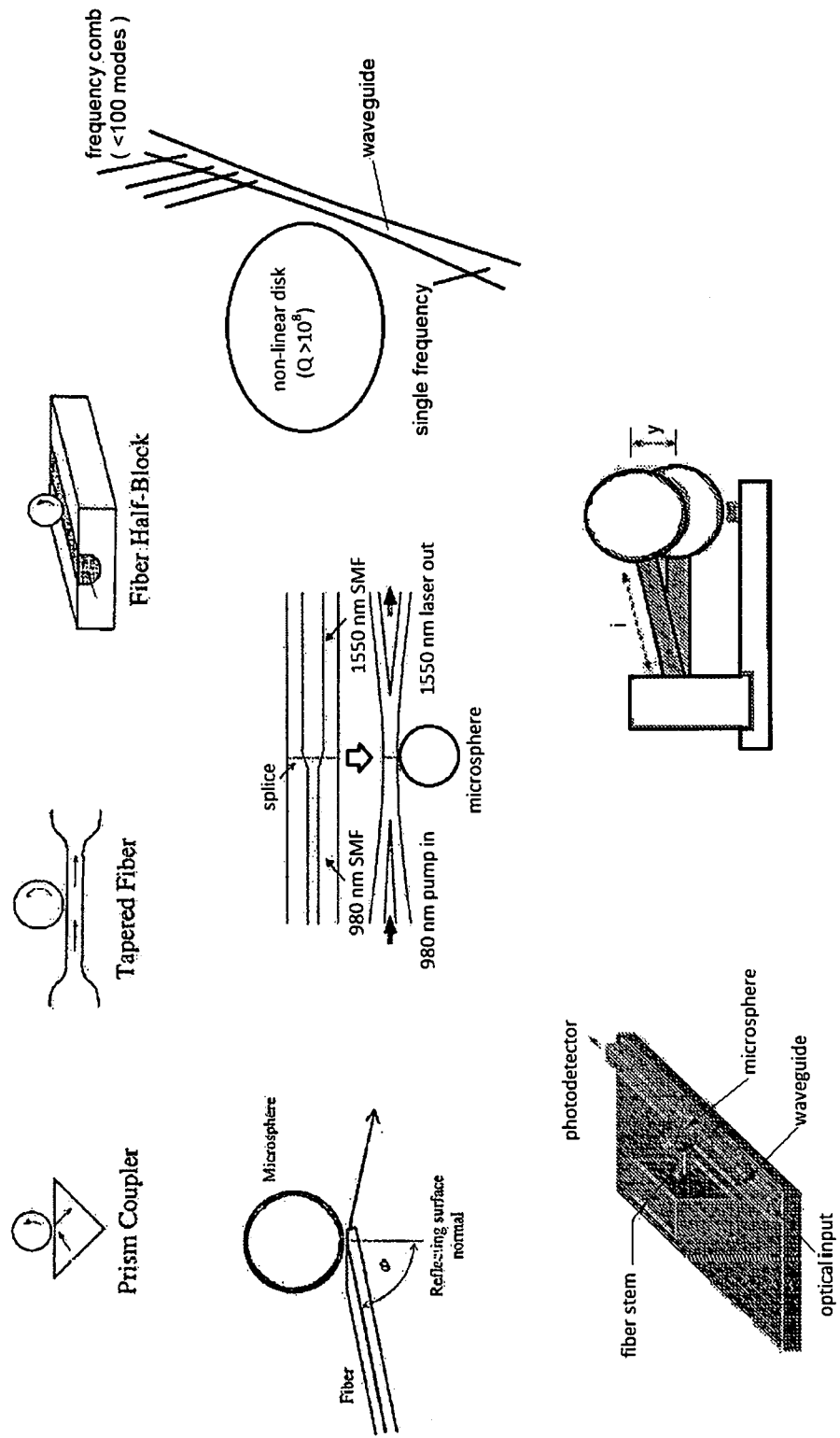

FIG. 7 shows some examples of evanescent field couplers in which the embodiments disclosed herein could be implemented.

Figure 8:
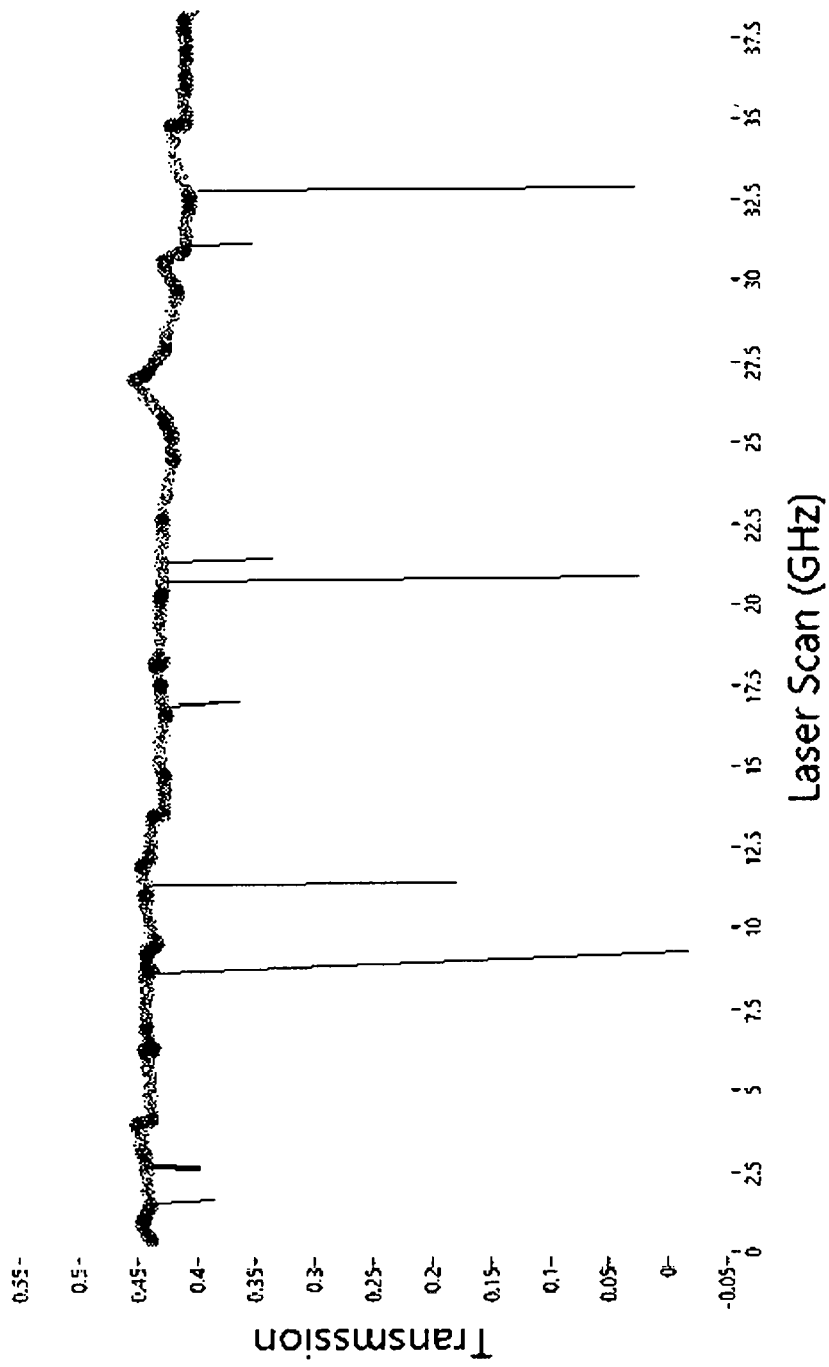

FIG. 8 shows an example plot of transmission (vertical axis, measured in units of e.g. Volts, or other arbitrary units) v. laser scan (horizontal axis, measured in units of GHz).

DETAILED DESCRIPTION OF PREFERRED EMBODIMENTS

This description will discuss at least asymmetry and heating effects, method of fabrication, tunable thermo-mechanical coupling characterizations, advantages and potential usages, as well as other features and embodiments.

The effects of laser energy deposition and laser damage on imperfect/deformed dielectric surfaces has been thoroughly examined for decades. The aforementioned research suggests that these imperfections—such as nanometer to micrometer-scale cracks or spherical pores—can alter the amount of energy deposited at the laser-dielectric interaction boundary. Rigorous experimentation shows that the deformation of the fiber and geometry of an asymmetric stem invoke local surface conditions that induce scattering of the light within the stem, resulting in uneven energy deposition throughout the silica, localized heating, and thermal expansion, all of which is desired. The net thermal expansion manifests as a linear displacement of a microsphere such that, when placed in a WGM coupling set-up, an increase or decrease in tapered fiber transmission is observed, depending on the orientation of the microsphere.

ASYMMETRY AND HEATING EFFECTS

FIGS. 1A-1E shows an asymmetric stem fabrication. Specifically, FIGS. 1A, 1B, and 1C show an initial state of the optical fiber 104 and the initial asymmetry resulting from side heating with a sub-fiber diameter CO2 laser 124 operating at ~12% power. FIGS. 1D-1E show an asymmetric-stem 112 connected to a microsphere 116, highlighting the 980 nm laser scattering region 120.

Normally, when light passes from the end of an optical fiber to the surrounding medium there are minimal thermal effects, which is what is shown in FIG. 1A. The light traversing the dielectric material passes through a predominantly uniform cross-sectional area into the surrounding medium with no heating of the silica. FIGS. 1B-1E shows the direction of propagation of light within the fiber 104 appears to be directed towards their respective regions of the asymmetric stem 112. The behavior suggests that, for a given sample, a core 108 of the fiber 104 has been bent to one side, thus asymmetric.

Figure 1F:
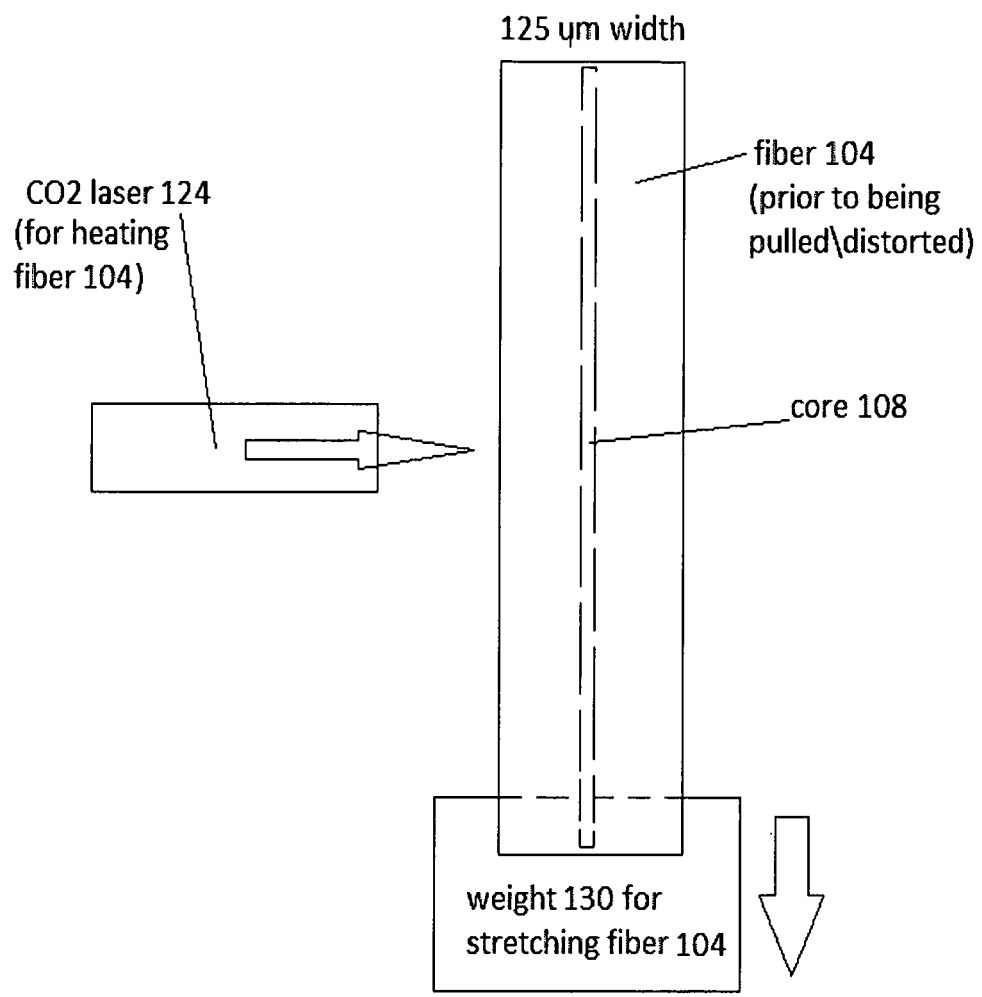
FIG. 1F shows how weights and CO2 heat are applied to the fiber in order to achieve the formation of the asymmetry and the microsphere.

FIGS. 1D, 1E, and 1F shows how the microsphere 116 is formed. Specifically, FIG. 1F shows a 125 µm fiber 104 having a core 108 which has a small weight 130 connected thereto, where the fiber 104 is side-heated by the CO2 laser 124. This results in the core 108 being deformed during the microsphere-formation process, as shown in FIGS. 1D-1E.

Afterwards, during use (e.g. having a 980 nm laser passed therethrough), the fiber 104 has been warped (asymmetric) in such a way that the 980 nm laser light is focused to one side. The end result is that such a geometry prevents the laser light from passing unimpeded from the optical fiber 104 to the end of the microsphere 116. This is a desired characteristic and an advantageous feature of the embodiments disclosed herein.

METHOD OF FABRICATION

In an embodiment, silica microspheres are made using the focused CO2 laser 124 (total power ~25 W) directed onto a piece of silica single-mode optical fiber (in an embodiment, a Thorlabs SMF-28 is used). A small weight 130 is attached to the bottom of the fiber 104. This weight 130, combined with the heat from the CO2 laser 124 ensures the formation of a stretched section which acts as a stem 112 of the microsphere 116. By using a beam, e.g. a CO2 laser, that was focused to a spot size smaller than a diameter of the fiber 104 and adjusting the position of the CO2 beam such that the heating was predominantly on one side of the fiber 104, an asymmetry and eventually a microsphere 116 can be formed in the fiber 104. In the case of forming the tapered fiber 208, the same configuration shown in FIG. IF is used, but the finishing steps to form a microsphere are not completed. Instead, the tapered fiber 208 is stretched with the small weight 130, heated by the laser 124, but only enough to achieve a desired tapered effect.

It is important to note that if the core 108 is too straight, light will pass from the stem 112 to the end of the microsphere 116, resulting in no scattering within the stem 112 so that no thermo-mechanical effects will occur and thus no displacement of the microsphere 116 will occur. It is desired to avoid this, as displacement of the microsphere 116 is a desired outcome of the various embodiments disclosed herein.

In an embodiment, it is also possible to induce further asymmetry by reducing a size of the hot spot 212 as much as possible and then pulsing the laser power in order to mimic an etching-like process via ablation—essentially carving the asymmetry out of the fiber 104. The deformation resulting from tapering and/or additional ablation can cause the fiber core 108 to taper towards one side (as shown at least within FIGS. 1D, 1E, and 2A), thus directing any incident light towards the asymmetric region.

A next stage of the fabrication process involves defocusing the laser beam 124 and heating the optical fiber 104 away from the stem 112. If done properly, the melted silica at the fiber tip will assume a spherical morphology, e.g. a microsphere 116, due to surface tension. Finally, broad-focus laser heating of the microsphere 116 is used, in order to reduce surface irregularities.

Naturally, as a key principle of the embodiments disclosed herein is the skewed (asymmetric) fiber core 108, it can be at times difficult to precisely control the manufacturing process. However, by slightly varying the fabrication method as described in more detail herein, an asymmetric stem 112 and skewed fiber core 108 can be achieved.

Post fabrication, the opposite end of the microsphere fiber 104 is spliced to the output from a 980 nm laser diode. In an embodiment, a standard EDFA pump type laser with a linewidth of a few nanometers and a maximum output power of 211 mW is used.

FIG. 2A shows a schematic diagram of the experimental set-up used to characterize a tunable thermo-mechanical coupling 200 according to the embodiments herein. Meanwhile, FIG. 2B shows how deformation of the fiber 104 during fabrication redirects the incident laser light towards the asymmetric stem 112. The local surface conditions of the asymmetric stem 112, once exposed to the external 980 nm laser source, exhibit localized heating and thermal expansion of the silica (in an embodiment, silica can be the base material from which the fiber 104 is formed, although other materials may also be used, either separately or in combination with silica), leading to an increase (or decrease) in a coupling distance $\Delta d$. In this disclosure, $\Delta d$ will refer to a distance between the microsphere 116 and a tapered fiber 208. Specific examples of $\Delta d$ are shown at least in FIGS. 2A, 2B, and 3A.

It is important to note that the tapered fiber 208 is different from the fiber 104 that is connected to the asymmetric stem 112 and the microsphere 116.

FIGS. 2C, 2D, 2E, and 2G show more detail about couplings according to the embodiments herein.

FIG. 2F shows a plot of intensity (vertical axis) v. wavelength (horizontal axis) for two different diameters of microspheres 116, specifically diameters of 18 µm and 40 µm.

FIG. 2H shows a graphic representation of various coupling conditions. Specifically, FIG. 2H shows a coupling spectrum plotting transmission (vertical axis, measured in units of e.g. Volts from e.g. a photodiode, or other arbitrary units) v. a taper-resonator gap (horizontal axis, measured in μm). Moving from left to right along the horizontal axis, it becomes apparent that as the gap distance decreases, the coupling changes from under-coupled, to a critical coupling point (evenly coupled), to over-coupled.

TUNABLE THERMO-MECHANICAL COUPLING CHARACTERIZATION

In order to isolate the aforementioned displacement Δd of the microsphere 116 and ascertain how it affects coupling efficiency, a standard WGM resonator-tapered fiber set-up is used (example set-up shown at least within FIG. 2A). As a means of checking the validity of the assertions herein, and as a means of quality assurance, the location of the scattering region was examined first, after which the microsphere 116 was positioned such that the asymmetry was present in the plane perpendicular to the tapered fiber 208 so that the microsphere 116 moved towards/away from the tapered fiber 208 in proportion to power supplied to the 980 nm laser.

The orientation of the microsphere 116 is important; if the displacement Δd is not perpendicular to the fiber, then the change in coupling is not maximized, or may not be observed at all. Using a piezoelectric nano-positioning stage (a non-limiting example being Thorlabs 3-Axis Piezo Controller MDT693A), the microsphere 116 was brought close to the tapered fiber 208 without initiating contact. Occasionally, the microsphere 116 came into contact with the fiber 208 directly while undergoing the displacement process. In a group of fabricated samples, if contact occurs, none of them could be separated by using the 980 nm laser. However, that does not mean these samples are discarded, or rendered non-usable. Instead, it just means they must be separated by hand, not by the laser. In an embodiment, the total displacement of the microsphere 116 is small enough (and the tapered fiber 208 flexible enough) such that the tapered fiber 208 remains in contact/bends with the microsphere 116 while it moves.

Examples of coupling conditions are shown in FIGS. 2G and 2H. Coupling is achieved by phase matching. In an embodiment, a propagation constant is matched with an effective index of taper mode and WGM. This results in ideal or near-ideal phase matching with the tapered optical fiber 208, including achieving as much as a 99.9% coupling efficiency. As stated, FIG. 2H shows a coupling spectrum plotting transmission (vertical axis, measured in e.g. Volts or arbitrary units) v. a taper-resonator gap (horizontal axis, measured in μm).

FIG. 3A shows example changes in coupling distance Δd for four independent samples, A, B, C and D (vertical axis) plotted against changes in laser power (horizontal axis). The results suggest the change in coupling distance Δd is directly proportional to laser power. This is advantageous because laser power is easily controllable, which means that Δd is also controllable. By checking the orientation of the microsphere 116 and examining the scattering region of the light in each case (see FIG. 1E), the results are consistent with the thermal deformation/stem thermal expansion principles described herein.

As shown in FIG. 3A, samples A, B, C and D exhibited displacement sensitivities of (4.42±0.12), (7.39±0.17), (2.81±0.08) and (17.08±0.76) nm/mW and total displacements Δd of 0.61 μm, 1.04 μm, 1.58 μm and 3.49 μm, respectively. Quantifying why one sample has larger displacement over another is difficult because the length starts at the position (and size) of the hot spot 208 (see FIG. 2B) and this is not always knowable with precision. Also, the displacement depends on the length and the diameter of the stem 112 which is not uniform. The transmission spectra for different input powers of the 980 nm laser applied to the sample D are shown in FIG. 7.

Whether or not the thermal deformation of the stem 112 could be used to traverse the different coupling regimes (under, critical and over-coupling, example shown at least within FIG. 2H) was also examined. For a particular mode, in sample D (FIG. 3A), the laser power was increased from 0-175 mW while the transmission spectrum for each power increment was recorded. This sample D was also examined while increasing and decreasing the power to the 980 nm laser, in order to show the reversibility of the thermal deformation/expansion process.

FIG. 3A further demonstrates that the embodiments described herein can achieve, if desired, more than 4 μm displacement with a displacement sensitivity of 17.08±0.76 nm/mW and a step resolution less than 30 nm, which is comparable to a single piezo.

The coupling depth of the selected mode in the observed transmission spectrum and the piezo voltage (Vc) were used as initial position references. The laser power was then incremented from 0 to 211 mW, causing the coupling depth of the chosen mode in the transmission spectrum to change. Then, by means of the piezoelectric nano-positioning stage, the microsphere 116 was moved until the initial coupling depth was reinstated. The voltage difference applied to the piezo stage between this new position (Vo) and the initial reference position (Vc) was used to determine the change in coupling distance (Δd=|Vc−Vo|×k p), where the measured sensitivity (k p) of the piezo stage was 0.36 μm/V, and the rated resolution of the piezo stage was 36 nm.

In order to exclude the possibility of cavity heating causing the observed transmission spectrum change, the relative change in transmission over an entire laser power range was determined for each sample. Also, as an extra means of precaution, and to ensure greater accuracy, each sample's non-contact transmission spectrum was obtained, then isolated for a period of time, and then re-measured. If the coupling did not vary over time, the subsequent results that were taken were deemed valid.

Examination of a particular mode with laser power variation over 175 mW shows evidence of traversing the different coupling regimes. The results indicate a linear increase in coupling distance Δd with increasing laser power for these microsphere orientations, consistent with the thermal expansion hypothesis when the orientation and scattering regions are taken into consideration. Displacement sensitivities of (2.81±0.08), (4.42±0.12), (7.39±0.17) and (17.08±0.76) nm/mW and a total Δd of (0.61±0.13), (1.04±0.13), (1.58±0.13), and (3.49±0.13)) μm are observed. The estimated error-tolerances shown herein include the minimum resolution of the piezo stage of 36 nm, as well as maximum observed fluctuation of the coupling depth for a given mode.

FIGS. 3B-3C show an example implementation of a coupling control. The mechanism of FIG. 3C can fit entirely within the device 300 shown in FIG. 3B. From FIG. 3B it is apparent that the entire coupling control is comparable in length to a paper clip. This is advantageous for showing/demonstrating that the embodiments disclosed herein take up a very small footprint, i.e. lab-on-a-chip.

FIG. 4A shows an on-resonance transmission as a function of the 980 nm laser power for sample D. The Q-factor of the microsphere sample is ~108. FIG. 4B shows a change in coupling versus time when the 980 nm laser is switched on and off between 0 and 175 mW.

FIGS. 4A-4B are different from FIG. 3A in that the laser power was ramped from zero to maximum at a rate of 20 mHz. Initially, the micro sphere 116 was at a distance Δd such that the mode was strongly under-coupled with the on-resonance transmission at 93% (off-resonance transmission is defined as 100%). As the power applied to the 980 nm laser was increased and Δd decreased, the coupling of the mode increased until the mode reached the critical coupling regime with on-resonance transmission of 1.4%. As the power applied to the 980 nm laser reached a maximum and the coupling distance between the microsphere 116 and tapered fiber 208 decreased, the mode entered an over-coupled regime with the on-resonance transmission increasing to 96%.

Next, as shown in FIG. 4A, when the power applied to the 980 nm laser decreased, the coupling followed the reverse trend with a bi-stable behavior. It is believed this reverse trend is due to the thermal response of the e.g. silica\glass composition of the fibers 104. To investigate this, the laser power was switched on and off and the mode coupling was recorded. When the laser was suddenly switched on/off, it would take the modes approx. 1.5 sec. to reach a steady coupling condition (see FIG. 4B). When the laser power was increased in steps and steady state was achieved between each step, as in FIG. 3A, the coupling behavior was symmetric for increasing and decreasing 980 nm laser powers. As such, the results shown in FIG. 4A provide evidence that the embodiments disclosed herein can be effective either with coupling regimes being either under-coupled or over-coupled.

In some samples there was no noticeable red shifting of the WGMs due to heating by the 980 nm pump. However, in sample D some laser light was able to travel to the sphere and cause heating. For FIG. 4A the total red shift was 12 GHz.

FIG. 6 shows implementations of WGM systems, including a microsphere, a microdisk, and a microtoroid. The embodiments described herein are specifically focused on the microsphere implementation. Long photon storage times coupled with small mode volumes leads to very high intensities of optical field, e.g. 1 mW. When these high intensities of optical field are coupled into a cavity with a Q (parameter which describes dampening of resonance) of ~108, and a mode volume V of ~1000 μm, this yields a circulating intensity of ~1 GW/cm2.

FIG. 7 shows some examples of evanescent field couplers in which the embodiments disclosed herein could be implemented. It is important to note that successful optical systems require efficient in/out coupling of light. One non-limiting way to achieve this is via overlap of evanescent fields. As shown in FIG. 7, examples of evanescent field couplers can include: prism couplers; polished fiber blocks and tips, fiber half-blocks, ridge waveguides, non-linear disks, and tapered optical fibers. This listing is not intended to be comprehensive, nor is it limiting. The point is that the embodiments described herein could be implemented in any of the coupling mechanisms shown in FIG. 7.

FIG. 8 shows an example plot of transmission (vertical axis, measured in units of volts or other arbitrary units) v. laser scan (horizontal axis, measured in units of GHz). The purpose of FIG. 8 is to show demonstrable test results verifying that the embodiments described herein are verified to work as described herein. Specifically, the change of the position Δd of the microsphere 116 is reflected in the abrupt spikes in transmission spectra as the reader moves along the horizontal laser scan axis. Examples of spikes can be seen at, for example, ~9 GHz, ~11 GHz, ~21 GHz, and ~33 GHz.

ADVANTAGES AND POTENTIAL USAGES (NON-LIMITING)

The following provides some (non-limiting) examples of advantages and potential usages of the embodiments disclosed herein.

Possible Applications

WGR applications, WGM applications, optical filters, temperature sensor, refractive index sensing, bio sensing, chemical sensing, force sensing, electric field sensing, optical modulators, optical switching, wavelength division multiplexing, optical frequency comb, optical accelerometer, optical gyroscope, nanoparticle detection and manipulation, microlasers, and viscosity measurements.

Possible Fundamental Physics

Cavity quantum, electrodynamics, cavity optomechanics, quantum mechanics, mie theory, geometrical ray optics, chaos, non linear optics, four wave mixing, up/down conversion, raman scattering/lasing, brillion scattering/lasing, and material science.

Advantages

All optical system, better resolution, lower power, no footprint at the device, long working life time, and can be implemented on chip (lab-on-a-chip).

APPENDIX

Below is not a listing of claims. Instead, the below is merely a preservation of some potential options on later claims.

XX. The method of claim XX, further comprising:
the piezoelectric nano-positioning stage comprising Thorlabs 3-Axis Piezo Controller MDT693A.

XX. The method of claim XX, further comprising:
starting the microsphere at a distance Δd such that the coupling mode was strongly under-coupled with the on-resonance transmission at 93%;
increasing the power applied to the laser and Δd decreased, the coupling of the mode increased until the mode reached the critical coupling regime with on-resonance transmission of 1.4%;
increasing the power applied to the laser reached a maximum and the coupling distance between the microsphere and tapered fiber decreased, the mode entered an over-coupled regime with the on-resonance transmission increasing to 96%; thereby
achieving a plurality of coupling regimes comprising under-coupled, critical-coupled and over-coupled.

XX. The method of claim XX, the coupling further comprising an evanescent field coupler.

METHODS OF TESTING

XX. A method of testing an optical coupling, comprising:
isolating a coupling distance Δd between a microsphere and a tapered fiber;
determining with certainty coupling efficiency by utilizing a standard WGM resonator-tapered fiber set-up;
examining a location of the scattering region of the generated light for each sample;
then, positioning the microsphere such that an existing stem-asymmetry is present in a plane perpendicular to a tapered fiber;

varying an amount power supplied to a laser according to predetermined steps and increments;
moving the microsphere towards/away from the tapered fiber in proportion to power supplied to the laser;
examining the coupling distance Δd while increasing and decreasing the power to the laser;
if the coupling distance Δd is not proportional to the power of the laser, determining that the coupling is improper; and
if the coupling distance Δd is proportional to the power of the laser, determining that the coupling is proper.

XX. The method of claim XX, further comprising:
applying voltage differences to a piezo stage between an initial reference position (Vc) and a new position (Vo) where the piezo stage has a measured sensitivity of (k p); and
determining a change in coupling distance according to (Δd=|Vc−Vo|×k p).

XX. A method of testing an optical coupling, comprising:
observing a relative change in transmission over an entire laser power range for a plurality of samples;
checking for a possibility of cavity heating causing the observed transmission spectrum change;
obtaining each sample's non-contact transmission spectrum;
isolating each sample for a period of time, and then re-measuring the relative change in transmission over an entire laser power range for each sample;
verifying whether the actual coupling behaved consistently over time;
if the optical coupling varied over time, determining that the optical coupling is not functioning properly;
if the optical coupling did not vary over time, determining that the optical coupling is functioning properly.

XX. A method of testing a nanopositioner implementation, comprising:
supplying power to a laser connected to a first fiber having an asymmetric stem and a microsphere;
switching the power on and off at predetermined intervals;
recording a mode coupling;
measuring a time required to reach a steady coupling condition;
increasing the laser power in steps;
achieving a steady state between each step;
checking whether the coupling behavior was symmetric for increasing and decreasing laser powers;
if the coupling behavior is not symmetric, determining that the nanopositioner implementation is invalid;
if the coupling behavior is symmetric, determining that the nanopositioner implementation is valid including where the coupling regimes are either under-coupled or over-coupled.

What is claimed is:

1. A method of fabricating a nanopositioner environment, comprising:
attaching a weight to the bottom of a predetermined length of a first fiber;
a CO2 laser side-heating the first fiber, where the CO2 laser is located perpendicular to a central axis of the first fiber;
applying side-heat to the first fiber, thereby deforming a core of the first fiber;
warping the core in such a way that the core is shifted to one side of the first fiber;
focusing a beam to a spot size smaller than a diameter of the first fiber;
adjusting the position of the CO2 laser such that the heating occurs predominantly on one side of the first fiber;
inducing an asymmetry by reducing the spot size;
pulsing the laser power in order to mimic an etching-like process via ablation; thereby
carving the asymmetry out of the first fiber thereby creating an asymmetric stem;
obtaining a predetermined geometry in the asymmetric stem suitable for preventing laser light from passing unimpeded through the first fiber;
melting a tip of the first fiber such that the melted tip of the asymmetric stem assumes a spherical morphology thereby forming a microsphere.

2. The method of claim 1, further comprising:
broad-focus laser heating of the microsphere; thereby reducing surface irregularities.

3. The method of claim 1, further comprising:
forming a tapered fiber;
stretching a predetermined portion of a second fiber with a small weight;
laser-heating the second fiber sufficiently to achieve a predetermined tapered effect but not sufficient to form a spherical morphology.

4. The method of claim 3, further comprising:
positioning the microsphere near to the tapered fiber, thereby forming a coupling arrangement.

5. The method of claim 1, further comprising:
de-focusing the laser beam and heating the first fiber away from the asymmetric stem.

6. The method of claim 1, further comprising:
wherein the first fiber comprises silica.

7. The method of claim 1, further comprising:
wherein the first fiber comprises a single-mode fiber.

8. A method of controlling a coupling distance Δd between a microsphere and a tapered fiber, comprising:
configuring a first fiber to have a microsphere-end, a non-microsphere-end, and a asymmetric stem adjoining the microsphere-end;
splicing an output from a laser to the non-microsphere-end of the first fiber;
the laser supplying laser light to the first fiber;
positioning a second tapered fiber to be near to the microsphere-end of the first fiber, thereby forming a coupling;
exploiting a deformation located within the core of the first fiber, thereby redirecting the incident laser light towards the asymmetric stem;
exposing local surface conditions of the asymmetric stem to the external laser source;
thereby causing localized heating and thermal expansion of the first fiber leading to an increase (or decrease) in a coupling distance Δd.

9. The method of claim 8, further comprising:
the asymmetric stem directing any incident light towards the asymmetric region.

10. The method of claim 8, further comprising:
utilizing the microsphere as a holder for objects.

11. The method of claim 10, further comprising:
positioning the objects by varying the laser power.

12. The method of claim 8, further comprising:
varying an intensity of the laser to achieve a variety of predetermined coupling regimes.

13. The method of claim 12, further comprising:
controlling the coupling distance Δd such that as the coupling distance Δd decreases, the coupling changes from under-coupled, to a critical coupling point (evenly coupled), to over-coupled.

14. The method of claim 13, further comprising:
achieving coupling by phase matching.

15. The method of claim 14, further comprising:
achieving phase matching with the second tapered fiber equal to or above 99.9% coupling efficiency.

16. The method of claim 8, further comprising:
ensuring that the orientation of the microsphere is such that the displacement Δd is perpendicular to the tapered fiber.

17. The method of claim 8, further comprising:
using a piezoelectric nano-positioning stage.

18. The method of claim 8, further comprising:
starting the microsphere at a distance Δd such that a coupling mode is strongly under-coupled with the on-resonance transmission at 93%;
increasing the power applied to the laser thereby decreasing Δd while increasing a coupling mode until the mode reached the critical coupling regime with on-resonance transmission of 1.4%;
increasing the power applied to the laser to a predetermined maximum and the coupling distance between the microsphere and tapered fiber is decreased and the coupling mode entered is an over-coupled regime with the on-resonance transmission increasing to 96%; thereby
achieving a plurality of coupling regimes comprising under-coupled, critical-coupled and over-coupled.

19. The method of claim 8, the coupling further comprising an evanescent field coupler.

20. A method of fabricating a nanopositioner environment, comprising:
attaching a weight to the bottom of a predetermined length of a first fiber;
a CO2 laser side-heating the first fiber, where the CO2 laser is located perpendicular to a central axis of the first fiber;
applying side-heat to the first fiber, thereby deforming a core of the first fiber;
warping the core in such a way that the core is shifted to one side of the first fiber;
focusing a beam to a spot size smaller than a diameter of the first fiber;
adjusting the position of the CO2 laser such that the heating occurs predominantly on one side of the first fiber;
inducing an asymmetry by reducing the spot size; thereby carving the asymmetry out of the first fiber thereby creating an asymmetric stem suitable for preventing laser light from passing unimpeded through the first fiber; and
melting a tip of the first fiber such that the melted tip of the asymmetric stem assumes a spherical morphology thereby forming a microsphere.

* * * * *